United States Patent
Bares

(10) Patent No.: US 6,934,412 B2
(45) Date of Patent: Aug. 23, 2005

(54) DETECTING SMALL AMOUNTS OF COLOR IN AN IMAGE

(75) Inventor: Jan Bares, Webster, NY (US)

(73) Assignee: Xerox Corporation, Stamford, CT (US)

(*) Notice: Subject to any disclaimer, the term of this patent is extended or adjusted under 35 U.S.C. 154(b) by 747 days.

(21) Appl. No.: 09/738,133

(22) Filed: Dec. 15, 2000

(65) Prior Publication Data

US 2002/0075491 A1 Jun. 20, 2002

(51) Int. Cl.⁷ ................................................ G06K 9/00
(52) U.S. Cl. ..................... 382/165; 382/164; 382/167; 382/264; 345/604; 358/518
(58) Field of Search .......................... 382/162–167, 382/260, 264, 270–275, 298–300; 345/589–593, 604; 358/518–523

(56) References Cited

U.S. PATENT DOCUMENTS

| | | | | |
|---|---|---|---|---|
| 5,233,413 A | * | 8/1993 | Fuchsberger | 358/518 |
| 5,282,026 A | * | 1/1994 | Nagata | 358/500 |
| 5,883,968 A | * | 3/1999 | Welch et al. | 382/100 |
| 6,160,644 A | * | 12/2000 | Lin | 358/518 |
| 6,240,203 B1 | * | 5/2001 | Kawano et al. | 382/164 |
| 6,249,592 B1 | * | 6/2001 | Fan et al. | 382/112 |
| 6,510,246 B1 | * | 1/2003 | Boliek et al. | 382/232 |

OTHER PUBLICATIONS

Rosenfeld et al., "Digital Picture Processing," vols. 1 & 2, 2nd ed., 1982, (relevant pages only).*

* cited by examiner

Primary Examiner—Bhavesh M. Mehta
Assistant Examiner—Yubin Hung
(74) Attorney, Agent, or Firm—Fay, Sharpe, Fagan, Minnich & McKee, LLP

(57) ABSTRACT

A method for classifying an image as one of color and neutral assigns respective values associated with a plurality of pixels in the image to a plurality of respective current pixels. Reduced image pixels are produced as a function of the current pixels. The image is classified as one of neutral and color as a function of the reduced image pixels.

17 Claims, 5 Drawing Sheets

DETECTING SMALL AMOUNTS OF COLOR IN AN IMAGE

BACKGROUND OF THE INVENTION

The present invention relates to digital printing. It finds particular application in conjunction with detecting color objects in a scanned image and will be described with particular reference thereto. It will be appreciated, however, that the invention is also amenable to other like applications.

An automated decision identifying whether a scanned image is neutral or contains color objects is important for further processing and printing. When correctly recognized as neutral, it may be desirable to render an image using merely black K toner, rather than toners used for printing colors and process neutrals (e.g., the cyan-magenta-yellow-black ("CMYK") colorants), to potentially increase print quality. Using the CMYK colorants to render an image may decrease printing speed by as much as about four (4) times relative to rendering an image using merely black K toner. In some situations, however, it is desirable to render an original image using all four (4) of the colorants. For example, an image of black text may also include a small company logo or a single word and/or symbol emphasized in color (e.g., on an instruction sheet enclosed with medications). It is desirable to render such an image using all four (4) of the colorants.

Conventional methods for color detection are implemented by transforming the image into the CIELab color space. Then, the number of pixels within the image having a chroma above a suitable threshold are determined. If some other color space is preferred in the image processing path, suitable measures of pixel chroma and lightness must be developed before a general scheme of image processing, which may include isolating the legitimate color pixels, can be applied. In addition to the legitimate color pixels, undesirable color pixels, mostly at the edges of neutral areas may also be generated in the scanning process. While such pixels have generally lower chroma, their population may be overwhelming (because, for example, there may be a large number of text characters on a page). For example, a scan of a test pattern including black text and a small (e.g., four (4) point), bright colored word, may produce legitimate color pixels that represent only about 0.001% to about 0.01% of all the pixels above a reasonable chroma threshold.

The present invention provides a new and improved method and apparatus which overcomes the above-referenced problems and others.

SUMMARY OF THE INVENTION

A method for classifying an image as one of color and neutral assigns respective values associated with a plurality of pixels in the image to a plurality of respective current pixels. Reduced image pixels are produced as a function of the current pixels. The image is classified as one of neutral and color as a function of the reduced image pixels.

In accordance with one aspect of the invention, the pixels are produced by determining, as a function of the current pixel values and a plurality of neutral thresholds, if any of the current pixels include at least one low chroma component. Intermediate pixel coordinates are stored in accordance with: 1) if a current one of the current pixels is determined not to have a low-chroma component, a value of the corresponding intermediate pixel is stored as the value of the current component; and 2) if a current one of the current pixels is determined to have a low-chroma component, a value of the corresponding intermediate component is stored as a neutral value.

In accordance with a more limited aspect of the invention, the reduced image pixels are produced by selecting a reduction filter and averaging the intermediate pixels in accordance with the reduction filter to produce the reduced image pixels.

In accordance with an even more limited aspect of the invention, the pixels are averaged by assigning the intermediate pixel produced by the reduction filter a value representing an average of all the intermediate pixel values included in the current filter.

In accordance with another aspect of the invention, the pixels are classified by determining a count of the reduced image pixels having values above a color threshold and classifying the image as one of color and neutral as a function of the count.

In accordance with an even more limited aspect of the invention, before the count is determined and the image is classified as a function of the count, the respective values associated with the reduced pixels are assigned to the plurality of respective current pixels. Then, the determination whether the current pixels include a low-chroma component and the averaging of the intermediate pixels is repeated.

In accordance with an even more limited aspect of the invention, the selection of a current filter is repeated to determine a different filter.

One advantage of the present invention is that it increases the reliability of decisions for identifying whether an image includes color.

Another advantage of the present invention is that it increases the reliability of decisions for identifying whether to render an image using color toners in addition to black toners.

Another advantage of the present invention is that it decreases the rendering time for scanned images having non-legitimate color pixels.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
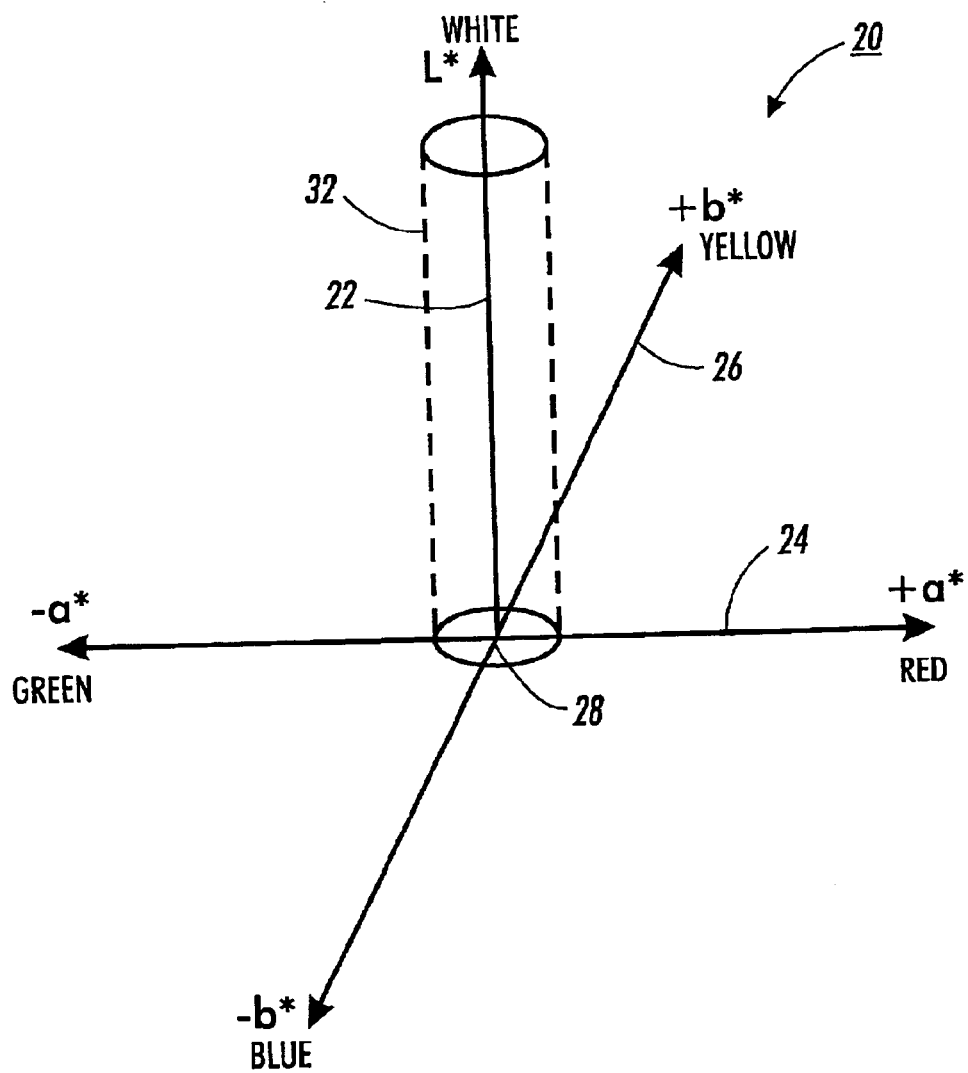
FIG. 1 illustrates axes showing the L*a*b* color space.

With reference to FIG. 1, neutral colors in the preferred embodiment are determined within the L*a*b* color space 20, which is generally defined by three (3) axes (i.e., the L* axis 22, the a* axis 24, and the b* axis 26). The L* axis 22 represents a neutral axis that transitions from black to white; the a* axis 24 transitions from green to red; and the b* axis 26 transitions from blue to yellow. A point 28 at which the three (3) axes 22, 24, 26 intersect represents the color black. Because the L* axis 22 transitions from black to white, positions along the L* axis represent different gray-scale levels. Furthermore, close-to-neutral colors are defined as:

$$a^{*2}+b^{*2}<T_n(L^*)$$

where: $a^{*2}+b^{*2}$ represents a square of the distance from the L* axis at any point (a*, b*) along the L* axis; and $\sqrt{T_n(L^*)}$ defines respective distances, or thresholds, from the L* axis, above which a color of lightness L* is no longer considered neutral.

In the preferred embodiment, the function $T_n(L^*)$ is represented as a cylinder 32. Therefore, all points in the L*a*b* color space that are within the cylinder 32 are considered close-to-neutral colors; furthermore, all points in the L*a*b* color space that are on or outside of the cylinder 32 are considered non-neutral colors. Although the function $T_n(L^*)$ is represented in the preferred embodiment as a cylinder, it is to be understood that the function $T_n(L^*)$ may take different forms in other embodiments. It is to be understood that although the preferred embodiment is described with reference to determining neutral colors in the L*a*b* color space, other color spaces are also contemplated.

In an alternate embodiment, neutral colors in the preferred embodiment are determined within the L*C*h* color space, in which $C^{*2}=a^{*2}+b^{*2}$ (i.e., C* and h* are polar coordinates in the a*,b* plane of the L*a*b* color space). In this case, the close-to-neutral colors are defined by comparing the color identifier in the L*C*h* space (the chroma C*) with a chroma threshold $C^*_{threshold}(L^*,h^*)$ that is determined as a function of two (2) coordinates, L* and a hue angle h*. Regardless of what color space is used, neutral colors are defined as those colors surrounding a neutral axis.

Figure 2:
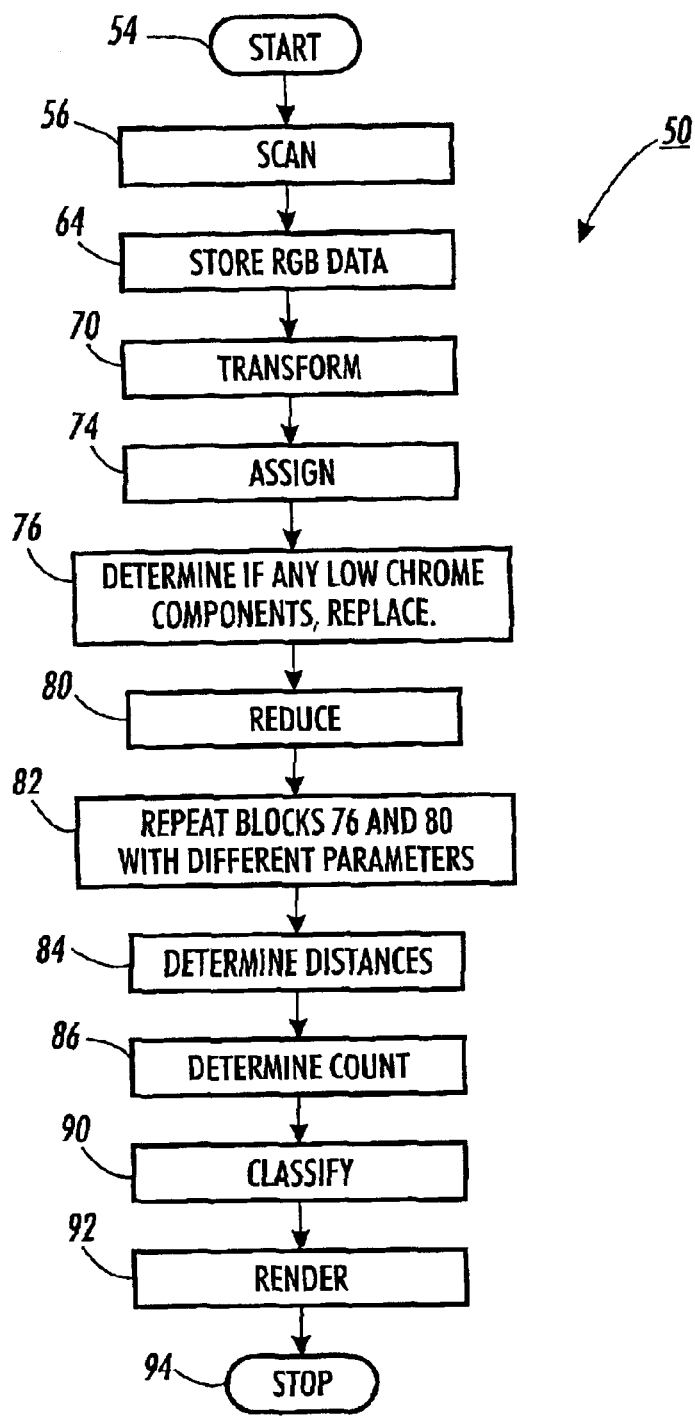
FIG. 2 illustrates a preferred method for classifying an image according to the present invention.
Figure 3:
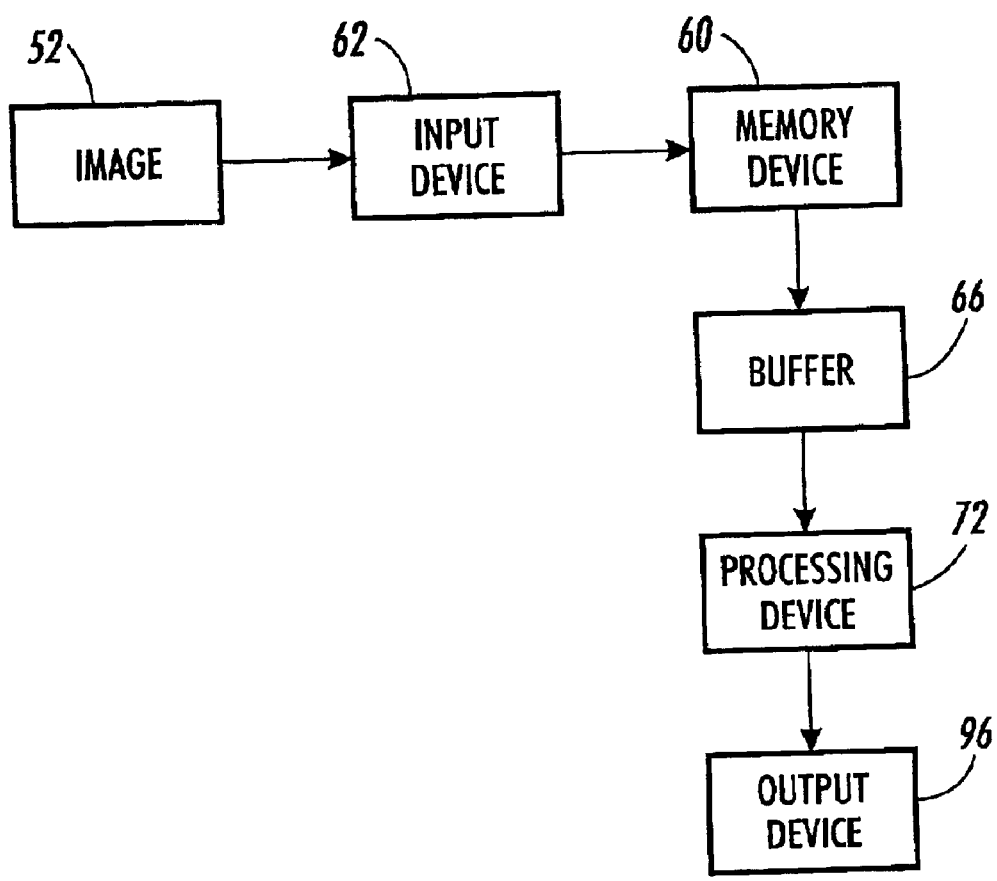
FIG. 3 illustrates a device for classifying images according to the present invention.

With reference to FIGS. 2 and 3, a method 50 for classifying an image 52 as one of color and neutral starts in a step 54. The image 52 is scanned, in a step 56, into a memory device 60 using an input device 62 (e.g., a scanner). In this manner, each of the pixels within the image 52 is associated with a color identifier. More specifically, the input device 62 rasterizes the image by transforming pixels within the image 52 into components of a first color space (e.g., the red-green-blue (RGB) color space). The components of the RGB color space (e.g., the R, G, and B components) serve as the color identifiers of the respective pixels. The rasterized RGB image data stream is stored, in a step 64, in a memory buffer device 66 and transformed, in a step 70, into a second color space. In the preferred embodiment, the second color space is the L*a*b* color space; however, it is to be understood that other color spaces (e.g., the L*C*h* color space) are also contemplated.

As discussed above, the L*a*b* color space is defined using three (3) components (axes) (e.g., the L*, a*, and b* components (axes)), which collectively define the color identifier in the L*a*b* color space. Two (2) of the components (the a* and b* components) define the amounts of yellow, blue, red, and green in the pixel and, therefore, are referred to as the color components. The L* component defines the lightness/darkness of the pixel and, therefore, is referred to as the neutral component. The image 52 may include black-&-white (B&W) and/or color. The method 50 determines an appropriate process for rendering the image as a function of whether a threshold amount of color is present in the image 52.

A processing device 72, which receives data from the buffer 66, assigns, in a step 74, the values of the L*a*b* components of the color identifiers for each of the pixels in the image 52 to corresponding components of a plurality of respective current pixels. A determination is made, in a step 76, whether any of the current pixels contain low-chroma components (i.e., if any of the pixels include at least one color component that is a close-to-neutral color). More specifically, a determination is made whether the color component values of the current pixels represent one of a plurality of colors (i.e., is not a close-to-neutral color) by comparing the color component values to respective upper and lower thresholds. If any of the color component values of a current pixel represents a close-to-neutral color (i.e., is within the range between the upper and lower thresholds), that color component value is replaced with a neutral value (e.g., 128 on a scale between 0 and 255). For example, if close-to-neutral colors are defined to be within a range including upper and lower thresholds 123 and 133 (on a scale of 0 to 255), respectively, and a* and b* are 73 and 124, respectively, the a* value of the current pixel remains at 73 while the b* value is replaced with the neutral value (e.g., 128). It is to be understood that different upper and lower thresholds may be used for each of a* and b*. Furthermore, it is to be understood that in an alternate embodiment, rather than replacing the component values of the current pixel with new values (e.g., the neutral value 128), intermediate pixels, which include the respective color and neutral component values, are created.

The image 52 is reduced in a step 80 by a predetermined size of a pixel filter. For example, the filter may be sized to include two (2) pixels in the fast-scan direction and three (3) pixels in the slow-scan direction. By reduction is meant a process by which blocks (sub-groups) of the current (intermediate) pixels are averaged. More specifically, if the filter is sized as 2×3 pixels, the components of the six (6) pixels in the filter are averaged independently of each other. For example, all six (6) of the a* values are averaged, all six (6) of the b* values are averaged, and all six (6) of the L* values are averaged to produce a reduced image pixel with components $L^*_{avg}, a^*_{avg}, b^*_{avg}$. It should also be understood that in this example the number of pixels in the reduced image is only one sixth compared to the original image.

Then, a step 82, specifies to repeat the steps 76 and 80 with different parameters. For example, if a filter size of two (2) pixels in the fast scan direction by three (3) pixels in the slow scan direction (i.e., 2×3) is selected for the first pass of the steps 76 and 80, a filter size of two (2) pixels in the fast scan direction by two (2) pixels in the slow scan direction (i.e., 2×2) may be selected for the second pass. Note that the whole processing path is "hard wired" so that a 50 million pixel image, for example, is processed in about one-tenth or about one-hundredth of a second. In the preferred embodiment, the steps 76 and 80 are repeated one time. However, it is also contemplated to repeat the steps 76 and 80 more than one time and/or not at all.

Respective distances of each of the averaged (reduced) pixels from the neutral axis 22 are determined in the step 84. Then, the number of the distances exceeding a color threshold $T_n(L^*)$, which is determined as a function of a position along the neutral axis, is determined in a step 86.

Figure 5:
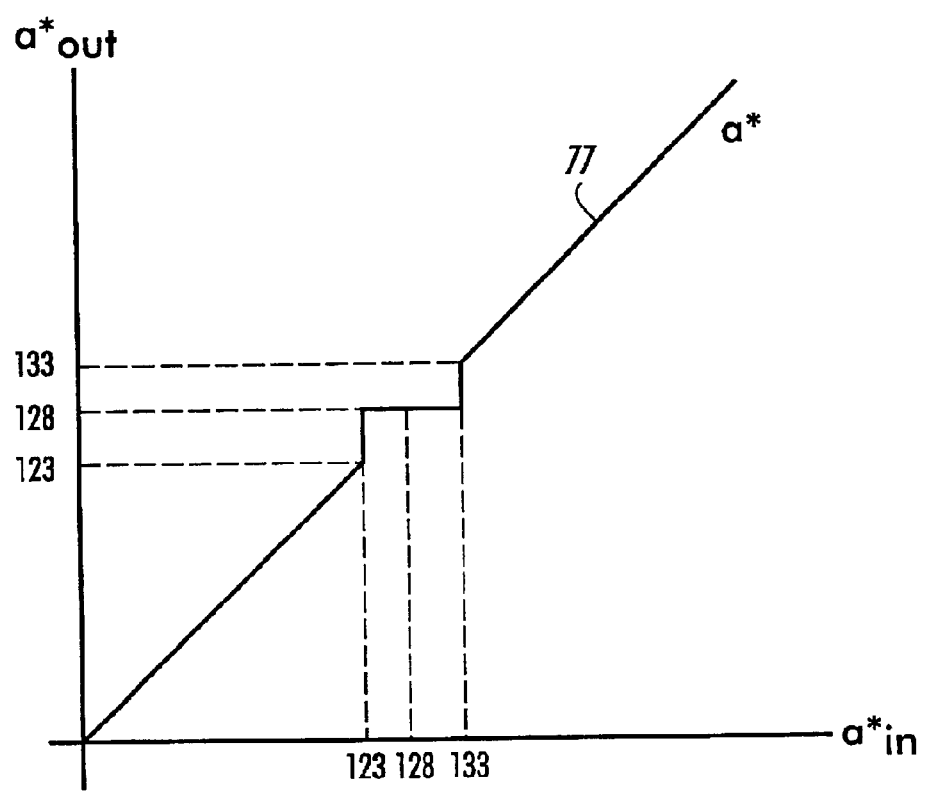
FIG. 5 illustrates a curve representing a* output versus a* input.

Alternatively, a count of the respective averaged (reduced) pixels having at least one of a plurality of corresponding color components within a range of color values is determined in the step 86 by a process utilized in the step 76. More specifically, the component values are compared with the respective thresholds for each of the a* and b* components. For example, the graph 77 shown in FIG. 5 shows the thresholds 123 and 133 associated with the a* axis. Similarly, the thresholds 124 and 132 may be associated with the b* axis (not shown). The thresholds define respective ranges of neutral values for the a* and b* axes. Therefore, if any of the components of a respective averaged (reduced) pixel is counted as a color pixel. As illustrated in FIG. 5, replacing a cylinder by a rectangular volume is computationally advantageous by avoiding the computation of sq (a*) and sq (b*). More importantly, this allows replacing a single threshold, of a cylinder radius, with four values for individually tailoring chroma thresholds.

The image 52 is classified in a step 90. In other words, a determination is made how to render the image 52 as a function of the number of the distances exceeding a color threshold $T_n(L^*)$; alternatively, the determination is made as a function of the count of the respective averaged (reduced) pixels having at least one of a plurality of corresponding color components within the range of color values. More specifically, a determination is made to render the image 52 using either a color image rendering process or a non-color image rendering process. The non-color image rendering process renders the image using one colorant; the color image rendering process, on the other hand, renders the image using a plurality of colorants. The image 52 is rendered, in a step 92, by an output device 96. In the preferred embodiment, the output device 96 is a color printing device such as a digital color printer or digital color facsimile machine. However, analog output devices are also contemplated. The method 50 stops in a step 94.

Figure 4:
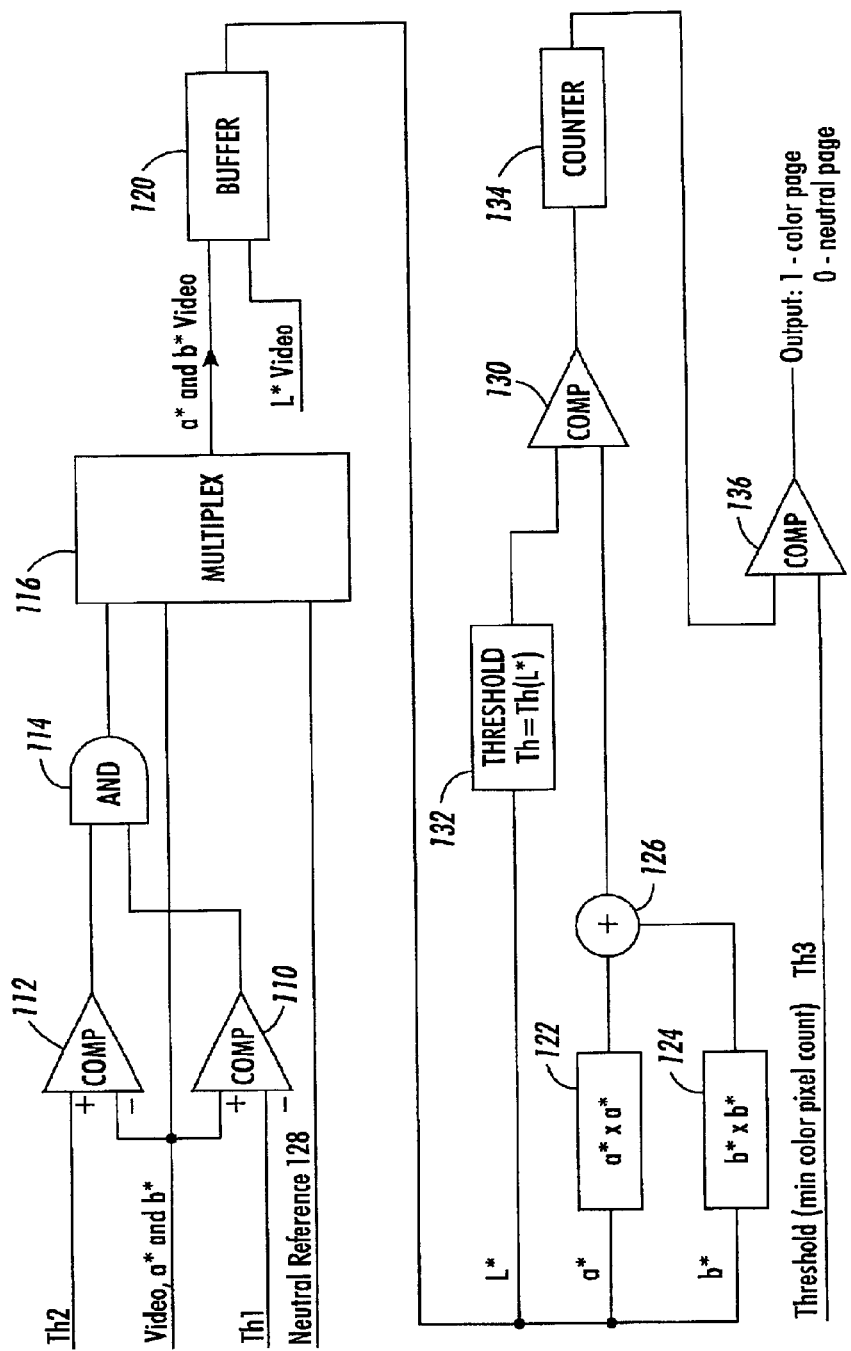
FIG. 4 illustrates a processing device according to the present invention.

With reference to FIG. 4, the processing device 72 includes first and second comparators 110, 112, respectively, which are used in the step 76 of determining whether any of the current pixels are low-chroma pixels. More specifically, the comparators 110, 112 compares both the a* and b* values with a lower threshold (e.g., 123) Th1 and an upper threshold (e.g., 133) Th2, respectively. As discussed above, it is contemplated that the thresholds be different for a* and b* and also during the different passes through the step 76. The outputs of the comparators 110, 112 are transmitted to a logical "AND" gate 114. If the current value being tested (e.g., the a* or b* value of the current pixel) is within the range of close-to-neutral values, the output of the "AND" gate is a logical "high"; otherwise the output of the "AND" gate is a logical "low". The logical output of the "AND" gate is transmitted to a multiplexer 116. If the output of the "AND" gate is a logical "high", the multiplexer 116 assigns the neutral reference value (e.g., 128) to the corresponding a* or b* value; otherwise, the multiplexer 116 assigns the current value to the corresponding a* or b* value.

The a* and b* values, along with the corresponding L* values, of the pixels are passed to a buffer and reduction filter 120, which averages the values according to the step 80 discussed above. The averaged values either proceed 1) to a circuit (not shown) including elements identical to the comparators 110, 112, the "AND" gate 114, the multiplexer 116, and the buffer and reduction filter 120, or 2) to multipliers 122, 124, which square the a* and b* values, respectively. (In the preferred embodiment, the averaged values pass through the circuit including the elements identical to the comparators 110, 112, the "AND" gate 114, the multiplexer 116, and the buffer and reduction filter 120 at most one time.) The squared a* and b* values from the multipliers 122, 124 are then added by an adder 126 and transmitted to a comparator 130. The L* value from the buffer 120 is transmitted to a threshold functional operator 132, which generates the close-to-neutral threshold as a function of the L* value. The close-to-neutral threshold is transmitted to the comparator 130, which compares the close-to-neutral threshold with the $a^{*2}+b^{*2}$ value determined by the adder 126. The comparator 130 generates a binary output as a function of the close-to-neutral threshold and the $a^{*2}+b^{*2}$ value. More specifically, the comparator 130 generates a value of "1" if the $a^{*2}+b^{*2}$ value is greater than or equal to the close-to-neutral threshold; otherwise, the comparator 130 generates a value of "0". As discussed above for the step 86, a counter 134 counts the number of pixels having the $a^{*2}+b^{*2}$ value greater than or equal to the close-to-neutral threshold (i.e., the number of pixels that are color).

The count of the number of color pixels is transmitted to a comparator 136, which compares the count with a threshold Th3 (i.e., a minimum count of color pixels) for determining if the image 52 will be classified in the step 90 as either color or neutral. As shown in FIG. 4, the output of the comparator 136 is "1" if the image is classified as color; furthermore, the output of the comparator 136 is "0" if the image is classified as neutral (or black-&-white).

As discussed above, the procedure replaces the low-chroma pixel components by neutral components, then reduces the image, and repeats the cycle. Replacement of low-chroma pixels by neutral pixels appears to be a second order correction, since the reduction step would bring such pixels close to the neutral level anyway. The procedure, however, was proven to be quite effective in the CIELab color space where it permitted achieving acceptable latitude with a total reduction ratio that is quite small (averaging only 6×4 blocks) thereby permitting detection of small color objects and narrow lines. (Note that only two (2) "compare" operations per channel are needed to identify the low-chroma pixels.) The resulting image is reduced by averaging n1×m1 blocks. The cycle is repeated again by replacing averaged low (below threshold) chroma pixels with neutral pixels followed by averaging n2×m2 pixel blocks. Unless the cycle is repeated again, the total reduction of the image is (n1×n2)×(m1×m2) and the final count of color pixels (i.e., those above the threshold) is made. This count is compared against the final decision threshold to determine whether the page/image contains enough color pixels to be classified as color. Note that there is a specific threshold in each step of the procedure, and it is not necessarily the same threshold value utilized in each step.

Those skilled in the art will appreciate that the step of replacing low chroma component of a pixel by a neutral component, essential for this process, introduces an operator that is non-comuting, that is, the order of operations of substituting neutral components for non-neutral followed by reduction cannot be reversed. And also the sequence of the substitution-reduction blocks, i.e., blocks of unit 76 followed by 80 (in the FIG. 2) cannot be reversed. By comparison the reduction operators are non-commutative, i.e., order of reductions by filter m×n followed by the filter k×l can be reversed—placing the k×l filter first followed by the filter m×n will produce the same result.

It is to be understood that other embodiments, including, for example, a different number of cycles in the algorithm, different substitutes for chroma and lightness than those described above (e.g., $Y,C_b,C_r$ color space, which is preferred in some graphics file formats), inclusion of morphological filters, and branching to either detect few bright color pixels or more of dull color pixels, are also contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for classifying an image as one of color and neutral, the method comprising:

scanning an image to produce components of a first color space, representing transformed pixels of the scanned image;

transforming components of the first color space into components of a three axes second color space;

a) assigning respective values associated with the components of the second color space to a plurality of respective current pixels, wherein the current pixels values include color components;

comparing the color component values to an upper and lower threshold value to determine if the color component values represent low-chroma components;

replacing low-chroma components with neutral values;

b) producing reduced image pixels as a function of the current pixels with said replaced low-chroma components;

determining respective distances of each of the average pixel values from a neutral axis of the second three axis color space;

determining a count of the distances exceeding a threshold, the threshold determined as a function of a position along the neutral axis; and c) classifying the image as one of neutral and color as a function of the said count of the distances exceeding a threshold.

2. The method for classifying an image as one of color and neutral as set forth in claim 1, wherein the producing step b) further includes:

f) selecting a reduction filter; and g) averaging the current pixels with said replaced low-chroma components in accordance with the reduction filter to produce the reduced image pixels.

3. The method for classifying an image as one of color and neutral as set forth in claim 2, wherein the averaging step g) includes:

h) assigning the reduced image pixels produced by the reduction filter a value representing an average of all the reduced image pixel values included in the current filter.

4. The method for classifying an image as one of color and neutral as set forth in claim 2, wherein before the steps of determining a count and classifying the image as a function of the count:

j) assigning the respective values associated with the reduced image pixels to the plurality of respective current pixels, wherein the current pixels values include color components;

comparing the color component values to an upper and lower threshold value to determine if the color component values represent low-chroma components;

replacing low-chroma components with neutral values; and k) repeating step g).

5. The method for classifying an image as one of color and neutral as set forth in claim 4, wherein the repeating step k) includes:

l) repeating the step f) to select a different current filter.

6. A method for rendering an image in accordance with one of a color image rendering process and a non-color image rendering process, the method comprising:

a) inputting pixel values, which are representative of the image, into a memory device;

transforming the pixel values into color components of a first three axes color space;

for each of a plurality of color component values defining each of the pixel values:

b) comparing the color component value to an upper and lower threshold value to determine if the color component value represents a low-chroma pixel;

c) if the color component value does not represent a low-chroma pixel, storing the color component value into a respective color component of a current pixel; and d) if the color component value does represent a low-chroma pixel, storing a neutral value into the respective color component of the current pixel;

e) determining respective average pixel values for a plurality of sub-groups of the current pixels, each of the sub-groups including a predetermined number of the pixel values;

determining respective distances of each of the average pixel values from a neutral axis of a second three axis color space:

determining a number of the distances exceeding a threshold, which is determined as a function of a position along the neutral axis;

f) determining to render the image using one of the color image rendering process and the non-color image rendering process as a function of the said number of the distances exceeding a threshold; and g) rendering the image in accordance with the determined rendering process.

7. The method for rendering an image as set forth in claim 6, wherein the step f) of determining includes:

h) determining a count of the respective average pixels having at least one of a plurality of corresponding color components within a range of color values.

8. The method for rendering an image as set forth in claim 6, wherein the step g) of rendering includes:

h) if the image is rendered in accordance with the non-color image rendering process, rendering the image using one colorant; and i) if the image is rendered in accordance with the color image rendering process, rendering the image using a plurality of colorants.

9. The method for rendering an image as set forth in claim 8, wherein the step g) of rendering further includes:

j) rendering the image on a digital color output device.

10. The method for rendering an image as set forth in claim 6, further including, before the steps f) and g) of determining and rendering:

h) repeating the steps b) through e) for the average pixel values.

11. The method for rendering an image as set forth in claim 10, wherein the step h) of repeating includes:

i) repeating the step e) using sub-groups including a different predetermined number of the current pixels.

12. A system for classifying an image as one of color and neutral, comprising:

means for assigning respective values associated with a plurality of pixels in the image to a plurality of respective current pixels;

means for determining, as a function of the current pixel values and a plurality of neutral thresholds, if any of the current pixels include a low-chroma component;

means for producing reduced image pixels as a function of the current pixels;

determining respective distances of each of the reduced image pixels from a neutral axis of a three axis color space;

determining a count of the distances exceeding a threshold, which is determined as a function of a position along the neutral axis; and means for classifying the image as one of neutral and color as a function of the said count of the distances exceeding a threshold.

13. The system for classifying an image as set forth in claim 12, wherein the means for producing includes:

means for generating intermediate pixels in accordance with:

if a current one of the current pixels is determined not to include a low-chroma component, a value of the corresponding intermediate pixel being generated as the value of the current pixel; and if a current one of the current pixels is determined to include a low-chroma component, a value of the corresponding intermediate pixel being generated as a neutral value.

14. The system for classifying an image as set forth in claim 13, wherein the means for producing selects a current filter and averages the intermediate pixels in accordance with the current filter to produce the reduced image pixels.

15. The system for classifying an image as set forth in claim 14, wherein the means for classifying determines a count of the reduced image pixels having values above a color threshold, the image being classified as one of color and neutral as a function of the count.

16. The system for classifying an image as set forth in claim 15, wherein the classifying means determines a fraction of the reduced image pixels including a predetermined level of color.

17. The system for classifying an image as set forth in claim 16, wherein the means for producing recursively produces reduced image pixels as a function of previously produced reduced image pixels, the image being classified as a function of the final reduced image pixel.

* * * * *